United States Patent
Friedrichs et al.

(10) Patent No.: US 9,639,697 B2
(45) Date of Patent: *May 2, 2017

(54) METHOD AND APPARATUS FOR RETROACTIVELY DETECTING MALICIOUS OR OTHERWISE UNDESIRABLE SOFTWARE

(71) Applicant: Cisco Technology, Inc., San Jose, CA (US)

(72) Inventors: Oliver Friedrichs, Woodside, CA (US); Alfred Huger, Calgary (CA); Adam J. O'Donnell, San Francisco, CA (US); Zulfikar Ramzan, San Mateo, CA (US)

(73) Assignee: Cisco Technology, Inc., San Jose, CA (US)

(*) Notice: Subject to any disclaimer, the term of this patent is extended or adjusted under 35 U.S.C. 154(b) by 22 days.

This patent is subject to a terminal disclaimer.

(21) Appl. No.: 14/610,429

(22) Filed: Jan. 30, 2015

(65) Prior Publication Data
US 2015/0205959 A1    Jul. 23, 2015

Related U.S. Application Data

(63) Continuation of application No. 13/781,434, filed on Feb. 28, 2013, now Pat. No. 8,978,137.

(60) Provisional application No. 61/605,120, filed on Feb. 29, 2012.

(51) Int. Cl.
G06F 11/30    (2006.01)
G06F 12/14    (2006.01)
G06F 21/56    (2013.01)

(52) U.S. Cl.
CPC ............ *G06F 21/56* (2013.01); *G06F 21/567* (2013.01); *G06F 2221/034* (2013.01); *G06F 2221/2115* (2013.01)

(58) Field of Classification Search
CPC .......... G06F 11/00; G06F 12/14; G06F 21/56; G06F 21/568; G08B 23/00
USPC ...................................... 726/18, 23
See application file for complete search history.

(56) References Cited

U.S. PATENT DOCUMENTS

| | | | |
|---|---|---|---|
| 7,836,506 B2 | 11/2010 | Liu | |
| 7,937,758 B2 | 5/2011 | Kronenberg et al. | |
| 8,510,841 B2 | 8/2013 | Richard et al. | |
| 8,621,233 B1 | 12/2013 | Manadhata et al. | |

(Continued)

OTHER PUBLICATIONS

Matthew G.;Data Mining Methods for Detection of New Malicious Executables; Year:2001; ACM; p. 1-12.*

(Continued)

*Primary Examiner* — Monjour Rahim
(74) *Attorney, Agent, or Firm* — Edell, Shapiro & Finnan, LLC

(57) ABSTRACT

A system retroactively detects malicious software on an end user system without performing expensive cross-referencing directly on the endpoint device. A client provides a server with information about files that are on it together with what it knows about these files. The server tracks this information and cross-references it against new intelligence it gathers on clean or malicious files. If a discrepancy in found (i.e., a file that had been called malicious, but that is actually benign or vice versa), the server informs the client, which in turn takes an appropriate action based on this information.

16 Claims, 9 Drawing Sheets

(56) References Cited

U.S. PATENT DOCUMENTS

| | | |
|---|---|---|
| 2005/0105524 A1 | 5/2005 | Stevens et al. |
| 2008/0244748 A1* | 10/2008 | Neystadt et al. ............... 726/25 |
| 2008/0320499 A1 | 12/2008 | Suit |
| 2009/0044024 A1 | 2/2009 | Oberheide et al. |
| 2010/0050244 A1 | 2/2010 | Tarkhanyan et al. |
| 2010/0100963 A1 | 4/2010 | Mahaffey et al. |
| 2010/0162400 A1 | 6/2010 | Feeney et al. |
| 2010/0192222 A1 | 7/2010 | Stokes et al. |
| 2011/0178831 A1 | 7/2011 | Ravichandran |
| 2011/0179484 A1 | 7/2011 | Tuvell et al. |
| 2011/0214187 A1 | 9/2011 | Wittenstein et al. |
| 2013/0067577 A1* | 3/2013 | Turbin et al. .................. 726/24 |
| 2013/0074185 A1 | 3/2013 | McDougal et al. |
| 2013/0283382 A1 | 10/2013 | Kim et al. |

OTHER PUBLICATIONS

Marco Cova "Detection and Analysis of Drive-by-Download Attacks and Malicious JavaScript Code"; University of California; WWW 2010, pp. 281-290.

* cited by examiner

METHOD AND APPARATUS FOR RETROACTIVELY DETECTING MALICIOUS OR OTHERWISE UNDESIRABLE SOFTWARE

CROSS REFERENCE TO RELATED APPLICATIONS

This application is a continuation of U.S. patent application Ser. No. 13/781,434, filed Feb. 28, 2013, entitled "Method and Apparatus for Retroactively Detecting Malicious or Otherwise Undesirable Software," which claims priority to U.S. Provisional Patent Application No. 61/605,120, filed Feb. 29, 2012. The entire contents of both prior applications are hereby incorporated by reference.

FIELD OF THE INVENTION

The present invention relates to the security of general purpose computing devices and more specifically to the detection of malicious software (malware) or any otherwise undesirable piece of software on a general purpose computing device, focusing on the retroactive detection and removal of such software.

BACKGROUND

It is known in the art that each day, many tens of thousands of new malicious or otherwise undesirable software programs are discovered. These programs can compromise the security of general computing devices. Possible security violations include, but are not limited to, the theft of data from the system, the usurping of the system for other nefarious purpose (like sending spam email), and, in general, the remote control of the system for other malicious actions.

One popular technique in the art for detecting malicious software comprises the following steps:
  a. Establishing through some independent means that the application is malicious (e.g., by manually analyzing it). This step is typically carried out by a vendor of anti-malware technology.
  b. Extracting a signature from this piece of software. A signature is a transformation applied to the software to extract a short string of data. Examples of signature can include a cryptographic hash or fingerprint. A hash is a mathematical transformation that takes the underlying binary contents of a software application and produces a relatively short string, with the idea being that two different applications will, with overwhelmingly high probability, have distinct fingerprint values. Common functions for performing this fingerprinting or hashing step include SHA-256, SHA-1, MD5, and others.
  c. Publishing this signature so that it is accessible to end-users operating a general purpose computing device
  d. Having the device determine if this signature matches one associated with any software applications that have arrived on the system.
  e. Applying a set of steps or a given policy if the fingerprints match (e.g., blocking the installation of the application).
  f. The above technique is geared towards situations when the signature was known ahead of time (i.e., before an actual piece of malicious or unwanted software arrived on an actual end-user system). Suppose that a piece of malware has already infiltrated end user systems prior to its discovery by an anti-malware vendor and prior to the creation of a signature for it. In this case, an end user system will have to cross reference every file it has against all new signatures. Given that a typical end user system can have many tens of thousands of files and given that many tens of thousands of signatures are created each day, this process of cross referencing can be prohibitively expensive to execute on an end user system. As a result, existing anti-malware vendors do not provide any form of efficient retroactive protection.

Aside from that, if an anti-malware vendor initially deems a software application to be malicious, but later learns that this determination was made in error (i.e., the particular application is actually benign), then there is no easy way for the vendor to retroactively undo its mistakes on end user systems without forcing users to scan their entire system for threats or clean files each time new intelligence on threats or clean files is discovered. Such an approach is prohibitively expensive, especially considering the large number of files on a given end-user system as well as the rate at which commercial anti-malware vendors gather new intelligence on the latest threats.

There is, accordingly, a need in the art to develop methods, components, and systems for retroactively handling two situations: First, retroactively detecting malicious software on an end user system in a way that does not incur a high computational cost directly for the end user; Second, retroactively undoing the effects of situations in which a file was erroneously labeled as malicious, but subsequently found to be benign.

SUMMARY OF THE INVENTION

In summarizing the invention, a system-level view is given, and then the components comprising that system as well as the methods to be executed on those components are described. It is to be understood that the in addition to the overall system, the invention being disclosed also comprises the individual underlying components used in the system as well as individual methods that would be executed on those components.

According to one aspect of the present invention, a system is provided that can be used to retroactively detect malicious or otherwise undesirable software on an end user system without actually performing any expensive cross referencing directly on the endpoint device. The system includes a client and server component, which communicate. The client provides the server with information about files that are on it as well as what it knows about these files. The server tracks this information and cross-references it against any new intelligence it gathers on clean or malicious files. If a discrepancy is found (i.e., a file that had been called malicious, but that is actually benign or a file that was previously called benign, but that is now believed to be malicious), the server informs the client, which in turn takes an appropriate action based on this information. For example, removing files that are now believed to be malicious and restoring files that were previously thought to be malicious, but are now believed to be benign.

According to another aspect of this invention, a client-side metadata extraction component is provided that can identify files of interest on the system (e.g., newly downloaded files) and can extract relevant metadata from these files for the purposes of helping to determine their respective dispositions.

According to another aspect of the present invention, a server-side logging component receives data from a metadata extraction component and logs this information together with any additional transactional information such as a timestamp (computed by the server) for when this data was received. This server-side logging component should also receive a client identifier to help identify which system transmitted the meta data. In addition to logging the data, this component may attempt to make a direct determination about whether the file's disposition is believed to be good/benign or bad/malicious based on the current state of intelligence gathered about that file. Note that this component will effectively have a record of what software applications reside on what end user systems and more specifically, it will have relevant signature information about these applications.

According to another aspect of the present invention is a server-side intelligence gathering module. This module is used to gather several pieces of information including, but not limited to: information about new malware, optional information about how to remove that malware, and information about files that are believed to be clean. With the data gathered from this module, a determination about a file can be made on the basis of that file's meta-data.

According to another aspect of the present invention is a server-side cross-referencing module that cross references information from the log collection component and the intelligence gathering component. As a result of this cross referencing process, the server will now contain two pieces of information. First, it will possess a list of systems that already contain malicious software together with an identifier for the file that contained that malware. Second, the server will possess a list of systems that have files which are actually clean, but which previously might have been deemed malware together with an identifier for the file that contained that malware so that the client can find the actual file (possibly after referencing any of its local logs). The server will make this information identifying the malware as well as (optional) information on how to remove that malware accessible to end-user clients.

According to another aspect of the present invention is a client-side polling module that will periodically poll the server component. The server will have a module that informs the client if it is among those that contain newly discovered malware. The client is not only told whether it has malware, but is optionally also provided with the information necessary to identify the file locally and remove it.

According to another aspect of the present invention is a client-side policy enforcement module that can take information received from the server, identify the actual file on the system associated with the information received from the server, and carry out any prescribed policy (such as removing a file that was deemed to be malicious).

According to another aspect of the present invention, a method is provided for extracting meta data from a file and storing it in a way that allows for retrospective remediation should the file be found to be subsequently malicious. In one embodiment of the present invention, this method will be performed on the server by processing logic that may comprise hardware (e.g., circuitry, dedicated logic, etc.), software (such as is run on a general purpose computer system or a dedicated machine), or a combination of both. It is to be understood, however, that the choice of where and how the method is performed is not to be limited by the present description, and it should be apparent to a person of ordinary skill in the art that many such choices exist.

According to another aspect of the present invention, a method is provided for logging file meta data on a server and storing it in a way that facilitates cross referencing that data against future intelligence. In one embodiment of the present invention, this method will be performed on the server by processing logic that may comprise hardware (e.g., circuitry, dedicated logic, etc.), software (such as is run on a general purpose computer system or a dedicated machine), or a combination of both. It is to be understood, however, that the choice of where and how the method is performed is not to be limited by the present description, and it should be apparent to a person of ordinary skill in the art that many such choices exist.

According to another aspect of the present invention, a method is provided for gathering intelligence data about files and storing that data in a way that facilitates cross referencing. In one embodiment of the present invention, this method will be performed on the server by processing logic that may comprise hardware (e.g., circuitry, dedicated logic, etc.), software (such as is run on a general purpose computer system or a dedicated machine), or a combination of both. It is to be understood, however, that the choice of where and how the method is performed is not to be limited by the present description, and it should be apparent to a person of ordinary skill in the art that many such choices exist.

According to another aspect of the present invention, a method is provided for cross referencing log data against intelligence data for the purpose of identifying files whose dispositions have changed (along with the users who have those files). In one embodiment of the present invention, this method will be performed on the server by processing logic that may comprise hardware (e.g., circuitry, dedicated logic, etc.), software (such as is run on a general purpose computer system or a dedicated machine), or a combination of both. It is to be understood, however, that the choice of where and how the method is performed is not to be limited by the present description, and it should be apparent to a person of ordinary skill in the art that many such choices exist.

According to another aspect of the present invention, a policy enforcement method is provided for taking information about new dispositions and acting on them in accordance with a local policy. In one embodiment of the present invention, this method will be performed on the server by processing logic that may comprise hardware (e.g., circuitry, dedicated logic, etc.), software (such as is run on a general purpose computer system or a dedicated machine), or a combination of both. It is to be understood, however, that the choice of where and how the method is performed is not to be limited by the present description, and it should be apparent to a person of ordinary skill in the art that many such choices exist.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

The subsequent description of the preferred embodiments of the present invention refers to the attached drawings, wherein.

DESCRIPTION OF EXAMPLE EMBODIMENTS

Overview

Figure 1:
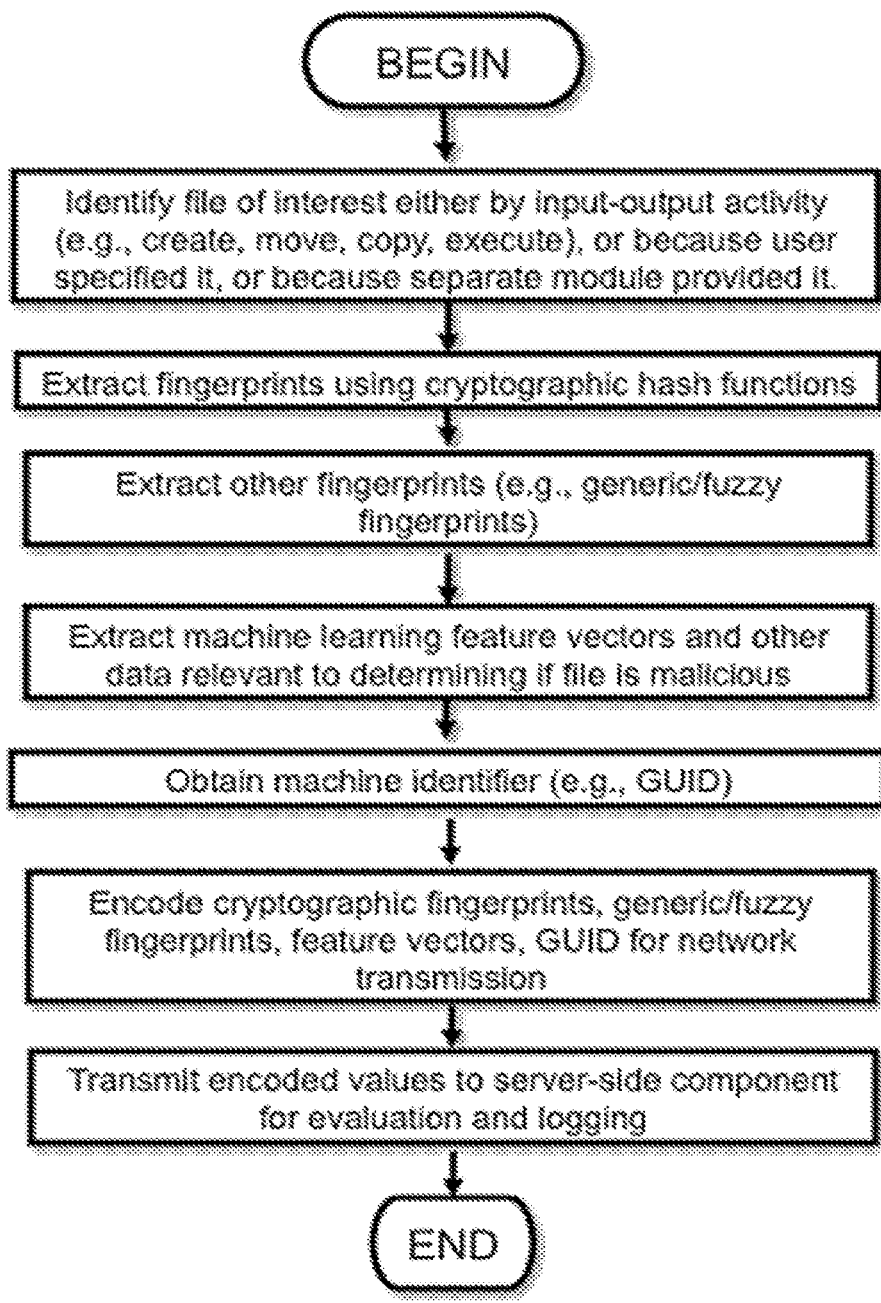
FIG. 1 Flowchart of a meta-data extraction method in accordance with an embodiment of the present invention.
Figure 2:
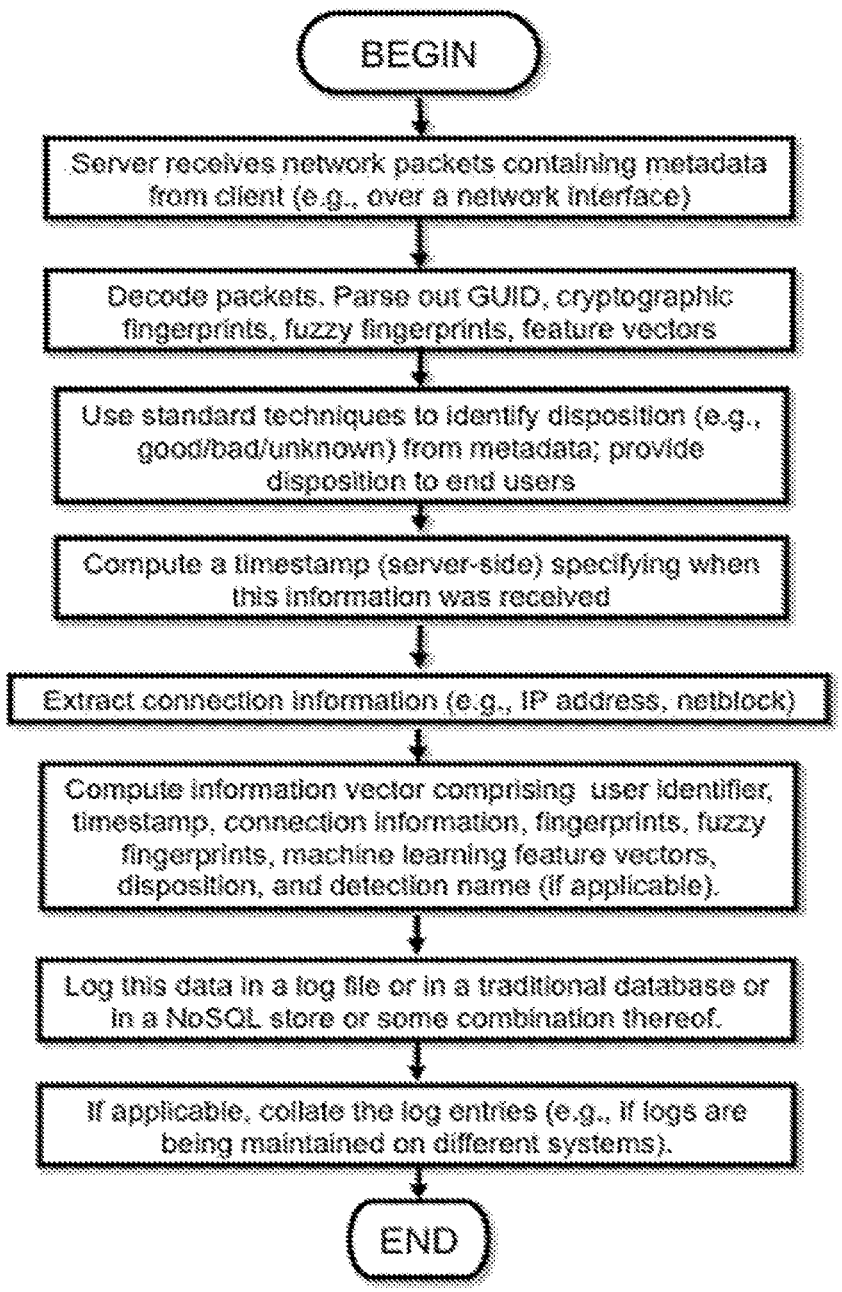
FIG. 2 Log collection method in accordance with an embodiment of the present invention.
Figure 3:
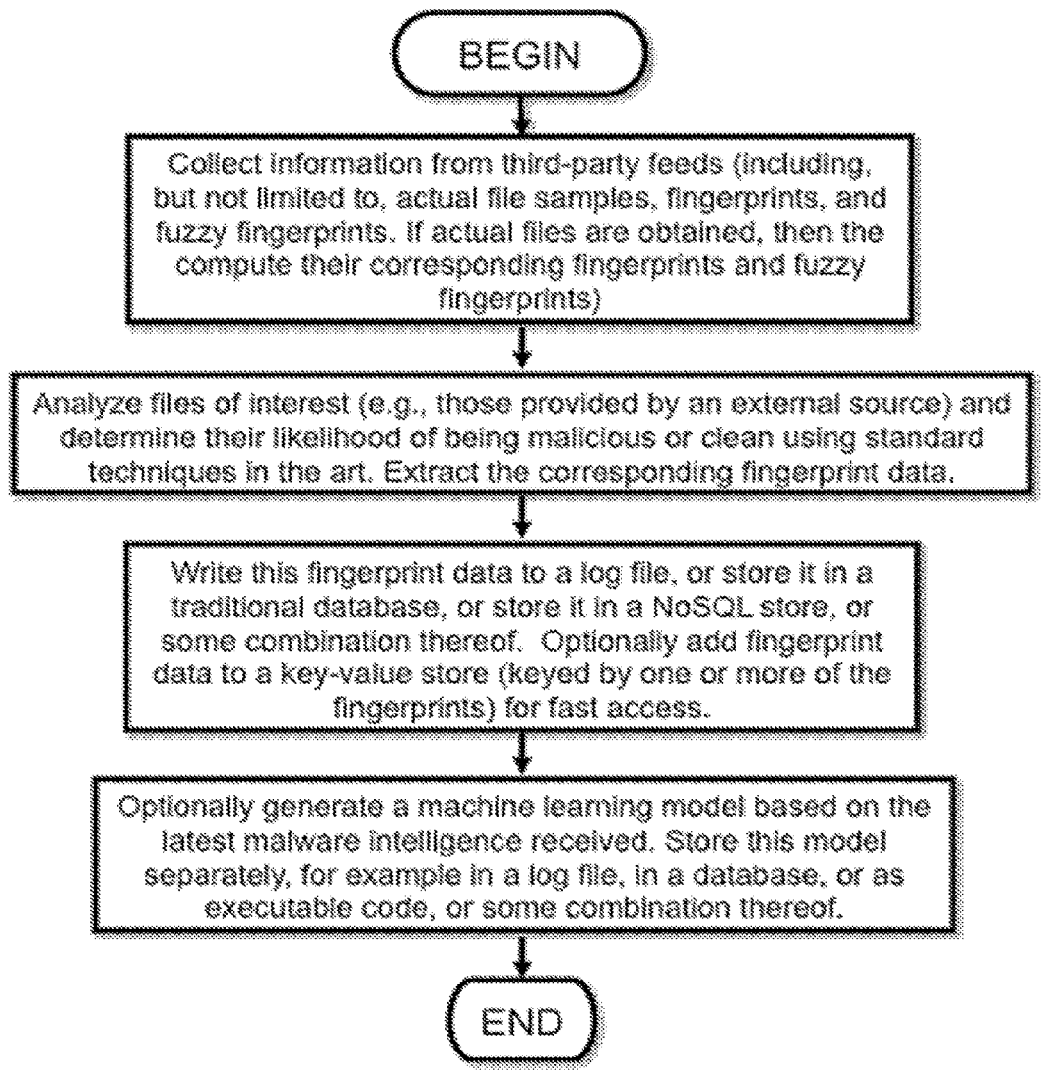
FIG. 3 Intelligence gathering method in accordance with an embodiment of the present invention.
Figure 4:
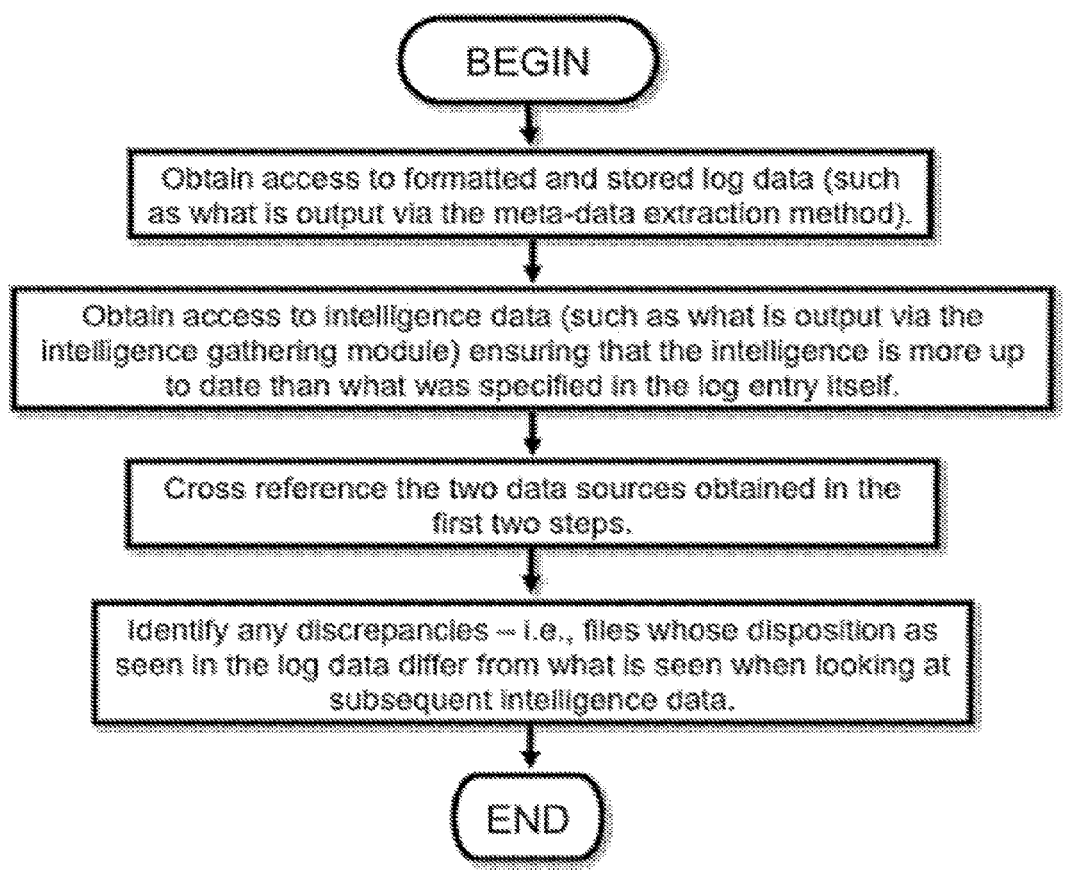
FIG. 4 Cross referencing method in accordance with an embodiment of the present invention.
Figure 5:
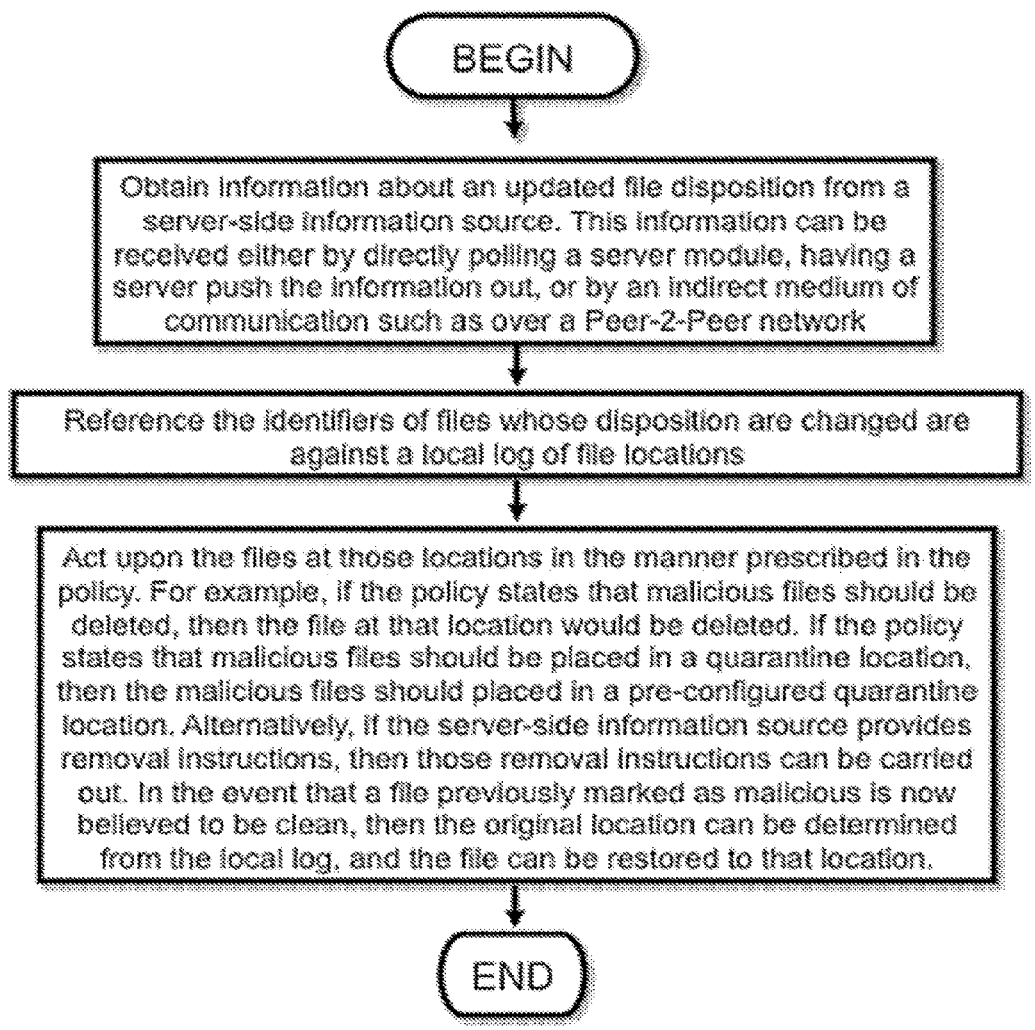
FIG. 5 Policy enforcement method in accordance with an embodiment of the present invention.

A server receives and stores information relating to files on a client device. The server receives information useful in classifying files as a threat, and classifies each of the files on the client device based on these pieces of information. The server receives updated information useful in classifying files as a threat and determines whether the classification for each file on the client device has changed. Responsive to a determination that a particular file on the client device has changed to not be a threat, the server sends an instruction to the client device (or to an administrative device responsible for the client device) that the particular file is available for use by the client device.

Example Embodiments

In the following description, numerous details are set forth to provide a more thorough explanation of the present invention. It will be apparent, however, to one of ordinary skill in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These descriptions and representations are the means used by those skilled in the data processing arts to most effectively convey the substance of their work to others skilled in the art. The steps described herein are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, solid-state disk drives, read-only memories (ROMs), random access memories (RAMs), EPROMs, EEPROMs, magnetic or optical cards, or any type of media suitable for storing electronic instructions, and each coupled to a computer system bus.

The descriptions presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein. A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The description that follows will reference terminology that is generally known in the art. In the art, the term malware refers to a malicious software application. Such an application can have a number of nefarious purposes. For example, malware can be used to perform a number of malicious actions. These actions include, but are not limited to: stealing digital information from a victim's machine; using the victim's machine in the perpetration of other malicious activities (such as sending out unsolicited email messages or spam); remotely control the victim's machine; and inhibiting the machine from operating normally. In the art, a computer virus is generally considered one example of malicious software. In addition to computer viruses, other types of malware in the art include, but are not limited to, Trojans, Worms, Downloaders, Remote Access Trojans, Infostealers, Rootkits, Scareware, and Misleading Applications. In general, malware is considered to be an undesirable application from the perspective of the end user. The invention described herein can be applied to any form of undesirable software application and should not be limited to any one specific form of malware.

Anti-malware software attempts to assign a disposition to a given software applications. To do so, it typically engages in an operation called scanning During this operation, the contents of a file are examined (and if applicable, other pieces of information are also examined, such as the behavioral attributes of that file). If an application is conclusively determined to be malicious (i.e., it corresponds to malware), then it is assigned a disposition of malign or bad. In this case the application is either deleted outright from the system, though typically it is put in a special quarantine location so that it can be restored should there have been an error in calling it malicious.

If an application is conclusively determined to be non-malicious by anti-malware software, then it is assigned a disposition of clean or good. In this case, the application is typically allowed to continue its execution on the system.

If the anti-malware software is unable to conclusively determine whether an application is good or bad, then a disposition of unknown is assigned. The extent to which a determination must be conclusive depends on the particular situation. For example, in some scenarios, 95% certainty will be enough to make a determination. In other scenarios, 99% certainty might be required. Depending on the situation, an unknown application can be treated like either a good or bad application. For example, in highly security sensitive scenarios, it may make sense to delete or quarantine unknown applications. On the other hand, in less sensitive scenarios, unknown applications can be allowed to continue to stay on the system.

Anti-virus software is an example of anti-malware software that deals specifically with the removal of computer viruses, which are one form of malicious code. However, in the art the terms anti-malware and anti-virus have become conflated. For the purposes of the description provided in this disclosure, we will use these terms interchangeably.

In the art, the term false positive references a situation in which an otherwise legitimate application is accidentally deemed malicious (by a piece of anti-malware software). Similarly, a true positive references a situation in which a malicious application is correctly identified as such.

The false positive rate of a given anti-malware technology is a measure of the percentage of applications among a collection of clean applications that arc (incorrectly) labeled malicious. The true positive rate of a given anti-malware technology is a measure of the percentage of applications among a collection of malicious applications that are (correctly) labeled malicious.

It is therefore the objective of anti-malware software to achieve a high true positive rate while having a low false positive rate among the set of applications with respect to the set of applications that reside on end user systems.

In practice, there is a trade-off between the true positive and false positive rates. Typically, a high true positive rate means that a given piece of anti-malware technology aggressively identifies files as malicious; in this case, there is an increased risk of incorrectly calling a legitimate application malicious as well, which in turn means that the false positive rate will also be high. Therefore, anti-malware technology aims to provide a favorable tradeoff between the true and false positive rates (i.e., achieve a large increase in true positive rate while only incurring a small increase in the false positive rate).

In the art, the term signature references a relatively short sequence of values that can often (though not always) be used to identify if an application is malicious or not. In its most general incarnation, the signature is computed as a transformation applied to an entire software application. In the art, a signature is typically computed (e.g., by an anti-malware technology vendor) on a known piece of malware (e.g., that a commercial anti-malware technology vendor already possesses through its back office intelligence capabilities). The signature is either transmitted onto a client's system or it is stored on a server. When a client encounters a new piece of software, it will determine if that software matches the signature associated with a known piece of malware either by checking its local data store or by querying a server. It is understood in the art that a signature can either be specific or generic. If two software applications have the same specific signature, then with overwhelming likelihood, these two applications are entirely identical. One example of a specific signature in the art is a SHA-256 hash. A generic signature permits that possibility that variations on a given application will continue to have the same signature. If an application is taken, and superficial changes are made to it, then the generic signature on this application might continue to be the same as the original whereas a specific signature on it will with extremely high likelihood be different from that computed on the original. One example of a generic signature in the art is the PEhash. Another example of a generic signature in the art is ssdeep.

In the art, the term fingerprint is often associated with a traditional signature and the term fuzzy fingerprint is often associated with a generic signature. In the art, the term conviction refers to a situation in which a piece of software is identified as malicious on a client system.

Aside from signatures that are computed from the entire binary contents of a file, a signature may also be computed on a certain portion of the file. For example, whether the file contains specific contents at specific locations. A signature can also comprise a fingerprint or the concatenation of a plurality of fingerprints taken from different sections of the files. This technique is used when specific portions of the file are more germane to determining whether that file is likely to be associated with known malicious software.

Another mechanism in the art by which a file can be determined to be malicious works as follows.

First, a set of features are extracted from a particular piece of software. These features can include, but are not limited to: (1) static characteristics that can be obtained from the actual binary contents of the file associated with the software; (2) the static characteristics associated with the application; and (3) dynamic characteristics that can be determined by actually observing the execution of the software. Examples of static characteristics that can be gleaned directly from the binary contents of the file can include the size of the file, whether it is digitally signed, whether the file seems to contain structured data versus random looking data (with the latter being seen in malware instances where the authors try to obfuscate the operations to evade detection), the size of different sections of the file, and so on. Examples of static characteristics associated with the actual software application, but that cannot be gleaned directly from the static contents of the file, include the file's name, its path (i.e., in what directories and subdirectories it lies), what registry keys are associated with the file, and so on. Finally, dynamic characteristics might include whether the software application has attempted to access the network, whether it has pulled down additional software, whether it has tried to interfere with existing operating system processes, whether it has tried to overwrite any specific system files, and so on.

Second, from this set of features, a feature vector is formed. Third, the feature vector is evaluated. During this third phase, it is determined whether the features are indicative of the file being malicious versus benign. The actual methods for making this evaluation arc orthogonal to the present invention, and are generally understood in the art (for example, one can apply statistical machine learning techniques to feature vectors derived from a corpus of data comprising a representative sample of files whose dispositions are already known to derive mathematical models that can be subsequently applied to new files to determine whether they are good or bad on the basis of their feature vectors). From the perspective of this invention, the most relevant piece of data is that a feature vector can be used to determine whether a particular application is malicious.

The following description will also make use of the concept of a log, which is known in the art. A log is a record of transactions and actions made on a given system. For example, if a system were a web server, then a log would comprise a description of the plurality of clients who connected to the system, the times they connected, and what actions they took. With a log, one can construct a reasonable synopsis of what happened on a given system. In the context of an Anti-Virus system, including one that uses a server component for assisting a client that desires a disposition for a given software application, a log entry could include, but not necessarily be limited to, the following: a client identifier that can be used to link disparate transactions from the same client, a timestamp specifying the time a client made a particular request for the disposition of a particular application, the location of the client (as specified by its Internet Protocol or IP address), a description of the file whose disposition is being requested (e.g., as encoded by a file fingerprint such an MD5 or a SHA-256), any Anti-Virus fingerprints associated with the application (including, but not limited to traditional fingerprints and generic fingerprints), attributes of the software application in question (including, but not limited to a machine learning feature vector of the attributes of the application of interest), contextual data about the application of interest that may aid in determining its disposition, the response of the server component (including, but not limited to the final assigned disposition of the application, a sub-disposition that provides additional description about the application such as that the application was previous unseen or is common in the field, the recommendation the server makes to the client about that application, and the dispositions assigned by different sub-technologies that were used in the process of coming up with a final disposition, and a caching time or time-to-live for the response that indicates how long the response might be valid for).

Since queries to a server can potentially be complex and multi-faceted, the log entry can also include an entry that specifies a query type. For example, in one query to a server, a client might only include a basic fingerprint. In a subsequent query for the same file the client might include additional information. These two queries can be recorded separately with different query types (though when analyzing the logs, it might help to link the fact that the same client made two queries about the same file and for the purposes of additional data mining information from these two transactions can be aggregated and recorded together during a separate post-processing phase). A log would them comprise a plurality of log entries transmitted by a plurality of clients.

In the case of an anti-virus or anti-malware solution that uses a client-server architecture, there may be a plurality of servers to ensure high availability and improve overall reliability, especially in instances where there are too many end users to be serviced by just a single server. In this case, each server may maintain its own server logs. For the purpose of additional analysis of these logs, these logs may be concatenated or otherwise combined so that a single unified view of all transactions during a given time period can be obtained.

Log data can be optionally stratified or partitioned based on different criteria such as whether the users have natural groupings and sub-groupings that can include, but not be limited to, geographic groupings (i.e., the users are from similar locales) and affiliate groupings (i.e., the users might be affiliated with each other—for example, they may all be members of the same enterprise or may have acquired the disclosed apparatus through a common source—such as a common download server or common distribution channel). This scenario is relevant in instances where anti-malware technology vendors have different distribution partners—such as Internet Service Providers or Original Equipment Manufacturers. Here we may wish to treat different logs differently. In these cases, analysis can be performed by concatenating or otherwise combining this plurality of logs.

It should be borne in mind, however, that practices that attempt to reduce the false positive rate also generally reduce the detection rate since some actual malware might be inadvertently be called good as a result of any safety nets. In the art, it is acknowledged that such a tradeoff exists and depending on the specific application, it would be determined whether this tradeoff happens to be desirable. For example, if the risk of a false positive is reduced dramatically whereas the detection rate is only reduced slightly, then the tradeoff may be favorable. Alternatively, if the cost of a false positive is very high, which is very possible given that blocking a legitimate application could translate into monetary business losses, then it may be desirable to take a more conservative stance that reduces it substantially even if that creates a corresponding substantial drop in detection rate. On the other hand, if the cost of a missed detection (or false negative) is very high, such as what might happen for a system that needs to be highly secured, then a high false positive rate might be tolerable so long as the risk of a threat infiltrating the system is made very small.

According to one aspect of the present invention, a system is provided that can be used to retroactively detect malicious or otherwise undesirable software on an end user system without actually performing any expensive cross referencing directly on the endpoint device. The system includes a client and server component, which are capable of communicating with each other either directly or indirectly. The client extracts relevant meta-data from files of interest, such as a new file on the system, or a file that an end-user is specifically interested in scanning. The client provides the server with information about files that are on it as well as what it knows about these files. The client also provides the server with an identifier so that the server can subsequently determine which client contains which files. The server tracks this information and periodically or continuously cross-references it against any new intelligence it gathers on clean or malicious files. If a discrepancy is found (i.e., a file that had been called malicious, but that is actually benign or a file that was previously called benign, but that is now believed to be malicious), the server informs the client (either directly or indirectly). The client, in turn takes an appropriate action based on this information.

According to another aspect of this invention, a client-side metadata extraction component is provided that can execute the following steps: First, it identifies files of interest. In one embodiment, a file of interest is one written to the file system (or when any file is moved, copied, executed, or any interesting file input-output behavior is encountered). On Microsoft Windows systems, this step can be accomplished through a Microsoft Windows Mini-Filter File System driver that traps File Input-Output behavior. Situations where files are being written to disk can be treated as noteworthy and those files can be examined in more detail. Alternatively, an end-user can demand a scan of a particular file or a folder or directory comprising a plurality of files (or of the entire contents of one or more storage locations, including, but not limited to, a hard drive, an external drive, a CD ROM, or a DVD ROM), for any reason.

In this case, the corresponding files might be deemed of interest. Second, the meta-data extraction module extracts meta-data from this new file. This metadata can include one or more cryptographic hash values, one or more fuzzy hash values, one or more machine learning feature vectors, or some similar pieces of information that can be used in the art for identifying malware. The meta-data can also include behavioral characteristics and broader system characteristics (that can optionally be encoded within machine learning feature vectors or can be listed separately). This metadata as well as the actual software application associated with this metadata is recorded on the end user system. Third, this metadata, together with a user identifier, is transmitted to a separate (server) component. In extreme cases, the entire file can be transmitted to the server. In one aspect of the present invention, if the client is able to determine a disposition, then it can be sent to the server as part of the transaction. In another aspect of the present invention, the server can determine the disposition based on the data provided by the client. It should be noted that the first step (i.e., identifying a file of interest) can be carried out by a different component such as a separate file system mini-filter driver, and then this information can be passed to the metadata extraction module, which in turn can execute the remaining steps. The meta-data extraction component will also log the locations of files that are queried to the server. In this manner if a file is subsequently identified as malicious, it will be easy to locate that file and (for example) either remove it outright or place it in a quarantine location on the system. Moreover, it is understood that the purpose is to remove not just the malicious file in question, but also any undesirable artifacts of this file (such as files that were subsequently created by the file or that created this file or that are tied to it in some way).

According to another aspect of the present invention, a server-side logging component receives data from a metadata extraction component and logs this information together with any additional transactional information such as a timestamp (computed by the server) for when this data was received. As a result, it will effectively have a record of what software applications reside on what end user systems. More specifically, it will have relevant signature information about these applications. If the client provides a disposition (good/bad/unknown), then this component can record this disposition along with the rest of the log data. Alternatively, if no disposition is provided, this component can reference any existing intelligence (such as that collected by the intelligence gathering component described below) to determine whether the file's disposition is known and this information can be recorded. This component can optionally process this log information so that it can be more efficiently analyzed subsequently. In one aspect of the invention, the log data can be taken apart into its constituent components and stored in a SQL database, such as MySQL, Oracle, DB2, or SQL Server. In another aspect, the log data can be provided to a NoSQL technology, of which many are known in the art including, but not limited to, Cassandra, MongoDB, CouchDB, Riak, HBase, HIVE, Membase, Neo4j, and Redis. To effectively use such NoSQL technologies, it may be necessary to modify the format of the logs so that they can easily be processed by them. Possible ways to store log data include the Apache Log Format, Character-Delimited Separated Key-Value Pairs, JavaScript Object Notation (JSON), or Extensible Markup Language (XML).

According to another aspect of the present invention is a server-side intelligence gathering module. This module is used to gather several pieces of information including, but not limited to: information about new malware, optional information about how to remove that malware, and information about files that are believed to be clean. In one aspect of the present invention, the information gathered by the intelligence gathering module can be taken apart into its constituent components and stored in a SQL database, such as MySQL, Oracle, DB2, or SQL Server. In another aspect, the information gathered by the intelligence gathering module can be provided to a NoSQL technology, of which many are known in the art including, but not limited to, Cassandra, MongoDB, CouchDB, Riak, HBase, HIVE, Membase, Neo4j, and Redis. To effectively use such NoSQL technologies, it may be necessary to modify the format of the intelligence that is gathered so that it can easily be processed by these technologies. In one aspect of the present invention, the intelligence gathering module can receive data from third-party data feeds, such as feeds of known malicious software or known clean files. One well-known feed in the art is the NIST Software Repository Library (SRL). In another aspect of the present invention, the intelligence gathering module may process any files it has through malware analysis tools to see if their disposition can be conclusively determined. In another aspect of the present invention, the intelligence gathering module can train new machine learning models from a more recent and potentially more comprehensive set of malicious, clean, and unknown files. In another aspect of the present invention, the intelligence gathering module can determine new fuzzy fingerprints or other generic detection capabilities extracted from analyzing a more comprehensive set of malicious, clean, and unknown files.

According to another aspect of the present invention is a server-side module that cross references information from the log collection component and the intelligence gathering component. In one aspect of the present invention, if data from the logs and data from the intelligence gathering module are stored in database tables, then cross referencing can be carried out by performing a "JOIN" operation on these two tables. In another aspect of the present invention, the server-side cross-referencing module can take older machine learning feature vectors and examine them under newer models to determine if the dispositions previously associated with these files appear to have changed.

As a result of this cross referencing process, the server will now contain two pieces of information. First, it will possess a list of systems that already contain malicious software together with an identifier for the file that contained that malware. Second, the server will possess a list of systems that have files that are actually clean, but that previously might have been deemed malware together with an identifier for the file that contained that malware so that the client can find the actual file (possibly after referencing any of its local logs). The server will make this information identifying the malware (as well as optionally information on how to remove that malware) accessible to end-user clients. In one aspect of the present invention, the contents of this list can be broken apart and stored in a database, such as MySQL, Oracle, DB2, or SQL Server. In another aspect of the present invention, the contents of the list can be stored in a key-value store, of which many are known in the art, such as BerkeleyDB, Memcached, Tokyo Cabinet, MemcacheDB, Tokyo Tyrant, or Python Dictionary. In one aspect of the present invention, the "key" can be a client identifier and the "value" can comprise a file identifier and possibly also an updated disposition as well as instructions for how to remove the file. In another aspect of the present invention, information about how to remove the file can be stored separately, such as in a key-value store keyed by the file identifier or in a database.

End user clients will have a polling module that will periodically poll the server component. The server will have a module that informs the client if it is among those that contain newly discovered malware. The client is not only told whether it has malware, but is optionally also provided with the information necessary to identify the file locally and remove it. In one embodiment of the present invention, the client will poll according to a time schedule (such as every hour). In another embodiment, the client will poll the server as soon as it is activated. In yet another embodiment, the client can poll the server based on a trigger event such as a recent infection (since that could point to a compromised system in which there are other malicious files, some of which may have been missed previously). It is understood that other trigger events might be possible as well. For example, if the system recently rebooted or if it changed networks. It should also be understood that an administrator can be provided with capabilities to configure the rate and frequency of polling, and moreover that the frequency can change over time depending on any broader environmental considerations. In other embodiments of the invention, the server can either directly push this information to the client (rather than waiting for the client to "pull" it) or the client can access this information via different connection options, such as over peer-to-peer networks, mobile ad-hoc networks, etc. In the case of pushing out information, that can occur over a number of different communications scheme including, but not limited to, point-to-point communication, broadcast, or multi-cast. To safeguard the information broadcast encryption techniques can be used. To reduce traffic, one can employ content-based multicast techniques so that clients do not receive significantly more information about other clients.

In another aspect of the present invention, when the end-user polling component queries the server, the server can either look-up the client's identifier to see if there are any files it possesses whose dispositions have changed. As mentioned above, this data can be stored in mediums including, but not limited to, key-value stores or databases.

In another aspect of the present invention, is a client-side policy enforcement module that can take information received from the server, identify the actual file on the system associated with the information received from the server, and carry out any prescribed policy (such as removing a file that was deemed to be malicious). In one aspect of the invention, the policy enforcement module will obtain a file identifier from the server and look up any information stored about that file obtained from the meta-data extraction module. Information would include the location of the file in the file system. If the file was previously thought to be malicious and is presently thought to be clean, then the file can be removed from the system. In another aspect of the invention, the policy enforcement module can place the malicious file into a special quarantine area. The benefit of putting a file in quarantine is that it can be restored should it turn out that the file was erroneously called malicious. In another aspect of the present invention, the policy enforcement module can reference the information provided by the server to see it include any instructions for how to remove the file. For example, the removal script might also contain details about registry keys that might have been added when the file was executed as well as information on related files that might need to be removed together with the existing file. In another aspect of the described invention, the policy enforcement module can reference any additional information that the client system might have collected about the file that can aid in its successful removal. These pieces of information can include artifacts related to the file like registry keys, files that were created by the original file, the file that created the original file, and so on. It is generally understood that malicious software (or any application, for that matter) can have additional artifacts associated with it, and it is often desirable not just to remove or quarantine the original application, but to do the same for artifacts related to it.

In another aspect of the present invention is a meta-data extraction method executed on the client system for collecting data relevant to identifying whether an application is malicious or benign. The method comprises the following steps, each of which is optional. First, a file of interest is determined. This file can be determined on the basis of input-output activity on the underlying file system; for example a kernel driver can determine if a file is being written to the file system, or if there is a copy, move, or execution of a file. Alternatively, a file of interest can be directly specified by the user. Note that a separate module can provide information about a file of interest as well. Second, one or more cryptographic hash values are computed on the file. Standard cryptographic hash functions in the art include SHA-256, SHA-1, MD5, Tiger, HAVAL, and any of the SHA-3 candidates, among others. Third, one or more fuzzy fingerprints are computed. Standard fuzzy fingerprints in the art include PE Hash and SSDeep. Fourth a machine learning feature vector is computed. This vector comprises any features that are relevant to determining whether a particular file might be malicious. The vector can comprise both static features taken from the binary contents of the file, non-binary static features (such as the file name), dynamic features (such as characteristics about the actual behavior, network traffic, and so on), and other contextual features such as applications associated with the file in question (e.g., the application that created the file or any subsequent applications created when the file in question executed). Fifth, a machine identifier is determined. This identifier can be a standard operating system GUID (Globally Unique Identifier) or be a unique value established during registration. The main requirement is that the value is unique to a particular client and that the same client uses the same value during its transactions (though if multiple users use the same machine, then either a unique GUID can be sent for each user or more preferably, there is a way to distinguish different users, but still tie them to the same physical system such as by concatenating the system GUID with the username). Sixth, the fingerprints, the feature vectors, and the identifier arc encoded into an appropriate format for transmission over the network (of which there are many possibilities known in the art such as hexadecimal encoding, BASE 64 encoding, etc.), and the resulting encoded data is transmitted to a server (e.g., to a logging module).

Note that the steps in the above method can largely be carried out in any order once the file has been identified, though the data values can only be encoded once they are determined. Note also that data can be encoded as it is computed rather than all at once after the fact.

In another aspect of the invention is a method for logging file meta-data (typically on a server) in a way that can facilitate retrospective detection. The method comprises the following steps. First, one or more data packets are received over a communications network via a network interface. Second, the packets are decoded. Each packet should contain some subset of the following fields: (1) A client identifier (and possibly a user identifier for a specific user who used a system); (2) One or more fingerprints associated with a file; (3) One or more fuzzy fingerprints associated with the file; (4) One or more machine learning feature vectors associated with the file. Third, a disposition is determined based on the information provided (the disposition can be determined through a separate module or through any technique known in the art, including, but not limited to: checking whitelists/blacklists for the presence of fingerprints or fuzzy fingerprints; applying a machine learning classifier to the feature vectors; using any characteristics of the system on which the file recently came, such as its recent infection history; or using any aggregate information gathered about the file such as its patterns across a plurality of users and its prevalence). The disposition can be good, bad, or unknown. Further, the disposition can include a confidence value (or both the disposition and the confidence value can be encoded in a single number; for example, a number between 0 and 1 where 0 means good and 1 means bad, and numbers closer to one are more likely to be bad, in which case 0.85 would mean an approximately 85% chance the file is malicious). In the event of a bad disposition, a detection name can be computed if appropriate. Fourth, a server-side timestamp is computed. Fifth, relevant connection characteristics are determined; these characteristics can include, but are not limited to, the Internet Protocol (or IP) address of the system and the netblock associated with the system. Sixth, an information vector comprising the following entries is computed: user identifier, timestamp, connection information, fingerprints, fuzzy fingerprints, machine learning feature vectors, disposition, and detection name (if applicable). Seventh, this entry can be logged either in a log file or in a traditional database or in a NoSQL store or some combination thereof Eighth, the log entries can be separately collated (e.g., if logs are being maintained on different systems).

In another aspect of the present invention is a method for gathering intelligence information about files in a way that can subsequently facilitate retrospective detection. The method comprises the following steps, each of which are optional. First, information from third-party feeds is collected. This information might include actual file samples, fingerprints, and fuzzy fingerprints. If actual files are obtained, then the corresponding fingerprints and fuzzy fingerprints can be computed. Second, files of interest (provided via some external source) can be analyzed to determine their likelihood of being malicious or clean. The corresponding fingerprint data can be extracted. The fingerprint data can be written to a log file, stored in a traditional database, stored in a NoSQL store, or some combination thereof. In addition, the fingerprint data can be added to a key-value store (keyed by one or more of the fingerprints) for fast access. The intelligence gathering method can also separately generate a machine learning model based on the latest malware intelligence it receives. This model can be stored separately, for example in a log file, in a database, or as executable code, or some combination thereof. Note that the steps in the intelligence gathering module can be carried out in a different order than described above without materially affecting the final result.

According to another aspect of the invention is a method for cross referencing intelligence data with user transaction data to determine if new discrepancies arise (e.g., a file previously called unknown or clean that today is believed to be malicious; or a file that was previously called malicious or unknown that is presently thought to be clean). The method comprises the following steps. First, access to formatted and stored log data (such as what is output via the meta-data extraction method) is obtained. Second, access to intelligence data (such as what is output via the intelligence gathering module) is obtained. Third, these two data sources are cross referenced. There are a number of techniques in the art for cross referencing data, and the choice is orthogonal to the practice of the invention. Fourth, discrepancies are identified. In one aspect of the present invention, the cross-referencing step can be carried out via a "JOIN" operation (if the contents of the user logs and intelligence are stored in a SQL database or in a data store that permits SQL commands to be performed on a data set). In this case, the command would appear as follows:

SELECT USER_LOGS.client id, INTELLIGENCE.fingerprint, INTELLIGENCE.disposition
FROM INTELLIGENCE JOIN USER LOGS
ON USER_LOGS.fingerprint=INTELLIGENCE.fingerprint
    where USER_LOGS.timestamp>min time
AND (USER_LOGS.dispositon<>INTELLIGENCE.disposition)
GROUP BY USER_LOGS.client_id, INTELLIGENCE.fingerprint, INTELLIGENCE.disposition;

In this case, the table USER_LOGS contains user log data and the table INTELLIGENCE contains the current intelligence on files. By performing a join operation on these two tables (and using the fingerprint to enable the join), it is possible to identify instances where a disposition delivered to a user is different from the current disposition of the file. Note that min time can be configured to minimize how far back user logs are examined as a performance tradeoff (since if there are too many logs, it might be prohibitively expensive to query them). In the event where the same user can potentially query for the same file multiple times, the query would have to be modified to take the disposition associated with the most recent query from that user. There are techniques in the art for amending the query accordingly.

The above JOIN statement can be modified to use other fingerprints (such as fuzzy fingerprints) as the mechanism for joining the two tables. In this case, the names USER_LOGS.fingerprint and INTELLIGENCE.fingerprint can be supplanted with USER_LOGS.fuzzy_fingerprint and INTELLIGENCE.fuzzy_fingerprint.

Another way to implement the cross-referencing method is to use a key value store. In this case, the key values could be the fingerprints and the values could be the dispositions:

For each file in the intelligence store:
    Insert fingerprint, disposition into Key Value Store
For each log entry:
    Parse out the user identifier, disposition, and fingerprint
    If disposition !=Key Value Store(fingerprint) then:
        mark the user identifier, fingerprint, and
        disposition for retrospective remediation.

In the context of using machine learning techniques to identify malware, cross referencing is less efficient than doing a fingerprint or fuzzy fingerprint match. In this case, to find a discrepancy, a (newer) machine learning model would have to be applied to feature vectors from the logs to see if the newly derived disposition is different from the last disposition actually provided to the user. Note that the model itself does not have to be entirely new, but could represent a minor modification, such as a change to a parameter or even a threshold to determine maliciousness. For example, perhaps a confidence threshold of 99% was required previously, but now we are amenable to a confidence threshold of 95%. In this case, the model as a whole has not changed, but with this small parameter change we may unearth log entries whose new disposition differs from what was previously associated with it.

The cross-referencing method can also incorporate the steps of the intelligence gathering method and/or the logging method if it is desired to have this method perform all the requisite data manipulation steps.

In another aspect of the present invention is a method for enforcing policies around retroactive remediation of malicious files and clean-up of benign files. The method comprises the following steps. First, information about an updated file disposition is received from a server-side information source. This information can be received either by directly polling a server module, having a server push the information out, or by an indirect medium of communication such as over a Peer-2-Peer network. Second, the identifiers of files whose disposition are changed are referenced against a local log of file locations. Third, the files at those locations are acted upon in the manner prescribed in the policy. For example, if the policy states that malicious files should be deleted, then the file at that location would be deleted. If the policy states that malicious files should be placed in a quarantine location, then the malicious files should placed in a pre-configured quarantine location. Alternatively, if the server-side information source provides removal instructions, then those removal instructions can be carried out. In the event that a file previously marked as malicious is now believed to be clean, then the original location can be determined from the local log, and the file can be restored to that location. Moreover, it is understood that similar actions apply not just to the original file(s), but might apply to artifacts associated with the original file(s); such artifacts include, but are not limited to, registry keys, files created by the original file(s), and the file that created the original file(s).

Figure 6:
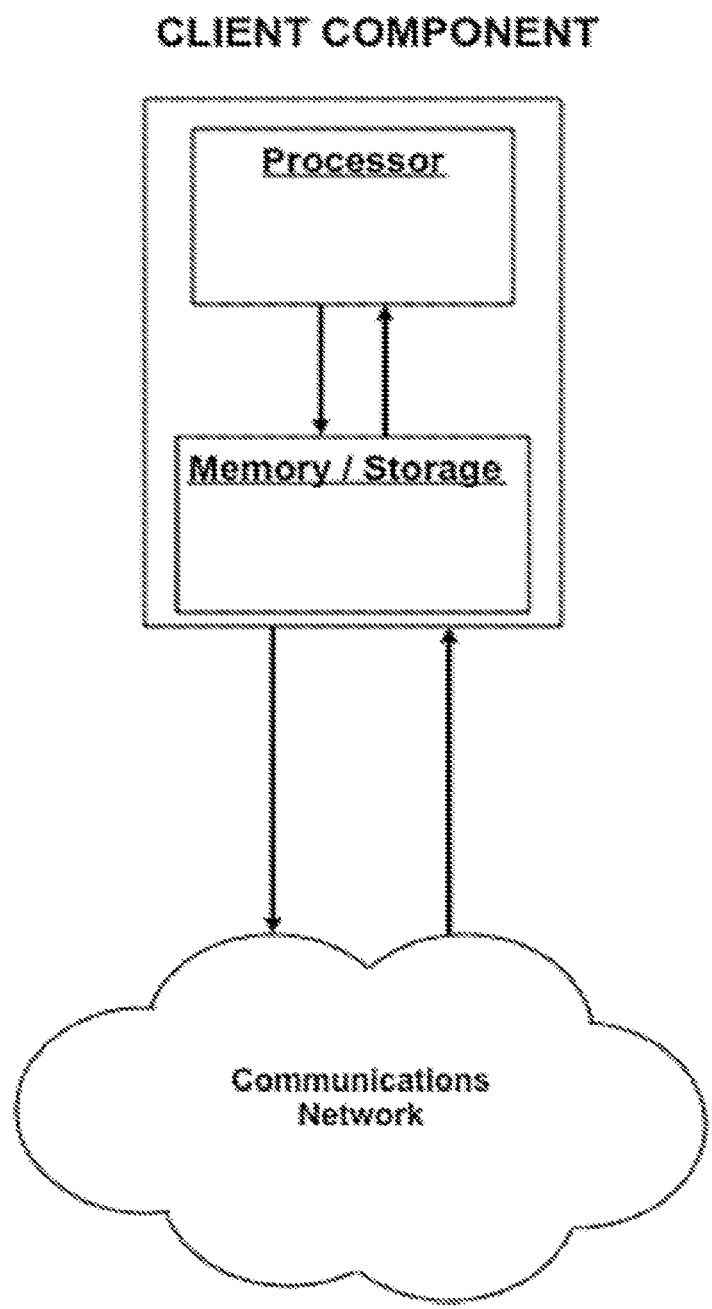
FIG. 6 is a client component in accordance with an embodiment of the present invention.
Figure 7:
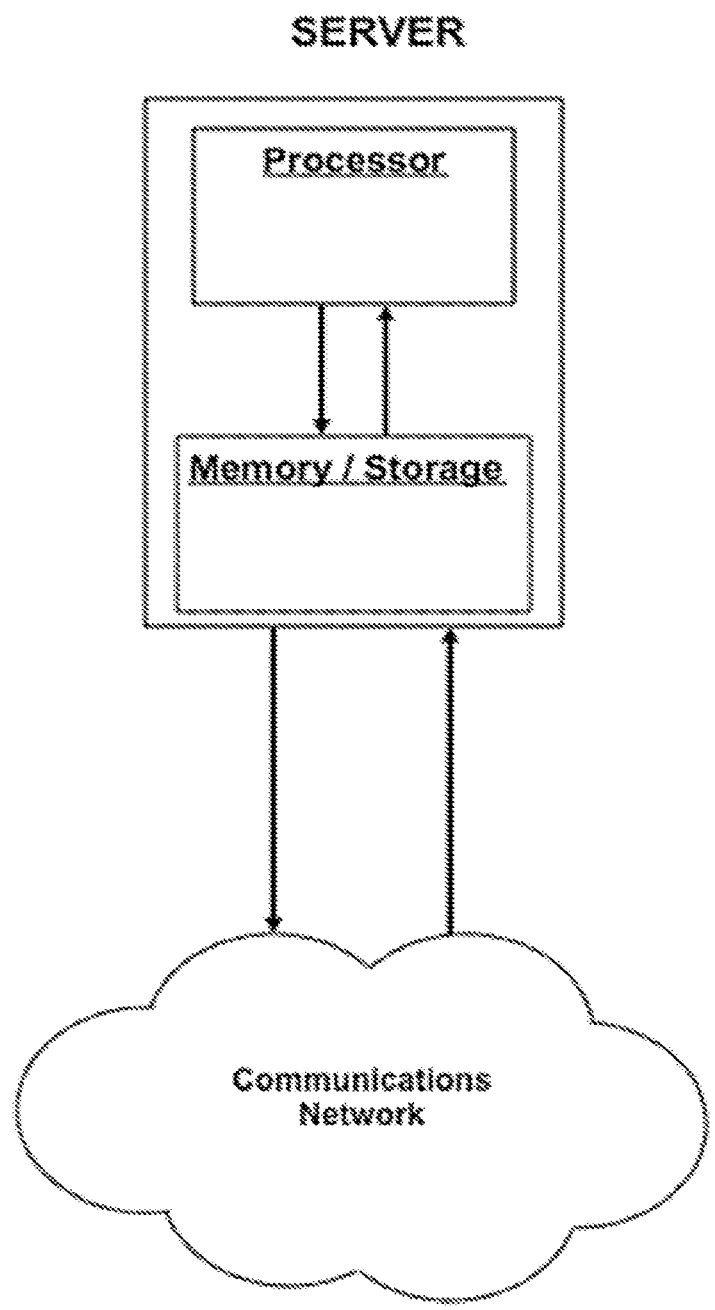
FIG. 7 is a server component in accordance with an embodiment of the present invention.
Figure 8:
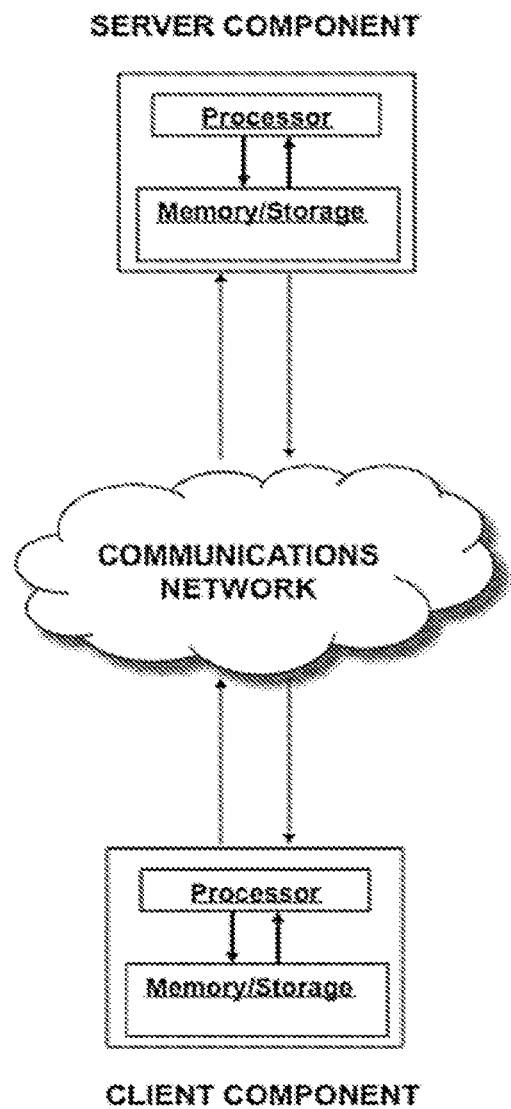
FIG. 8 is a system comprising client and server components in accordance with an embodiment of the present invention.
Figure 9:
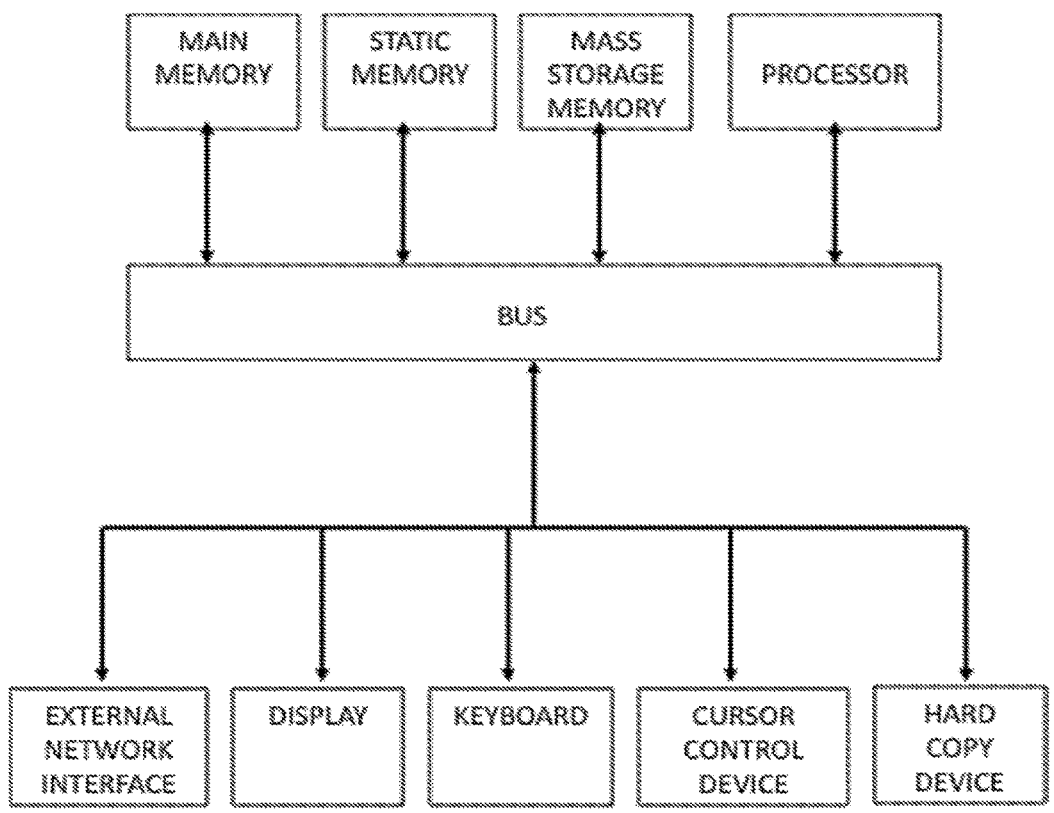
FIG. 9 is an exemplary computer system.

FIG. 6 is a block diagram of an exemplary computer system that may perform one or more of the operations described herein. Referring to FIG. 6, the computer system may comprise an exemplary client or server computer system. The computer system comprises a communication mechanism or bus for communicating information, and a processor coupled with a bus for processing information. The processor includes a microprocessor, but is not limited to a microprocessor, such as, for example, Pentium, PowerPC, Alpha, etc. The system further comprises a random access memory (RAM), or other dynamic storage device (referred to as main memory) coupled to the bus for storing information and instructions to be executed by the processor. Main memory also may be used for storing temporary variables or other intermediate information during execution of instructions by the processor.

The computer system also comprises a read only memory (ROM) and/or other static storage device coupled to the bus for storing static information and instructions for the processor, and a data storage device, such as a magnetic disk or optical disk and its corresponding disk drive. The data storage device is coupled to the bus for storing information and instructions. The computer system may further be coupled to a display device, such as a cathode ray tube (CRT) or liquid crystal display (CD), coupled to the bus for displaying information to a computer user. An alphanumeric input device, including alphanumeric and other keys, may also be coupled to the bus for communicating information and command selections to the processor. An additional user input device is cursor control, such as a mouse, trackball, trackpad, stylus, or cursor direction keys, coupled to the bus for communicating direction information and command selections to the processor, and for controlling cursor movement on the display. Another device that may be coupled to the bus is a hard copy device, which may be used for printing instructions, data, or other information on a medium such as paper, film, or similar types of media. Furthermore, a sound recording and playback device, such as a speaker and/or microphone may optionally be coupled to the bus for audio interfacing with the computer system. Another device that may be coupled to the bus is a wired/wireless communication capability to communication to a phone or handheld palm device.

Note that any or all of the components of the system and associated hardware may be used in the present invention. However, it can be appreciated that other configurations of the computer system may include some or all of the devices.

Example 1

This example illustrates a specific instance of the invention, describing the steps and actions along the way. This example is provided to help clarify the description, and it should not be considered limiting in any way. For example, the above invention description covers many variations and extensions. To avoid obscuring the example, these variations and extensions are not discussed below.

To begin, consider a piece of agent software running on a user's machine. According to this example, the agent software contains a Microsoft Windows file system mini-filter driver that can detect when an executable file is being written to the file system. Other software that can detect when an executable file is being written to the file system can also be used.

Following notification that there has been or is an attempt to write a file to the file system, the software agent can track and log information about the file on the system, such as its location in the file system, whether or not that file has created other files, and so on. This information will be helpful if the file deemed to be malicious and subsequently needs to be removed.

In addition, the agent computes several values. First, it computes "traditional" fingerprints, such as a SHA-256, on the file. In addition, it can compute a machine learning feature vector from the file. The feature vector will comprise a number of attributes associated with the file on this system, including, but not limited to: which DLLs are referenced by the application, the values of specific positions of the binary contents, the number of sections in the file (and any attributes associated with those sections—such as whether it is readable, writeable, or executable), the number of symbols, the size of the binary, whether the binary is digitally signed, etc. All of these attributes are easily computed from the binary contents of the file. In addition, other contextual pieces of information are included in the feature vector, including, but not limited to, the file system timestamp, properties of the filename (note that the same file may have different names on different systems, so this attribute is specific to an instance of the file on a given system), information about other software applications installed on the system (e.g., whether the system has any vulnerable software or software that commonly leads to a system infection, etc.), and recent infection history of the system (e.g., such as whether the user experienced any infections in the last half an hour). These attributes are to be encoded appropriately, and compressed as well (for compact transmission).

The client then sends these values to a server. In addition to these values, the client should send an identifier (to help identify the client in question should the item be deemed malicious subsequently). As remarked above, the client can log any information that is sent to the server so that this information can be subsequently cross referenced if necessary.

The server, in turn, first looks up the file in any blacklists and whitelists (using, for example, the traditional fingerprints to perform this look-up). If this look-up results in a conclusive disposition (e.g., the file is conclusively known to be malicious or benign), then this disposition is communicated to the client. If this check is inconclusive, the server can evaluate the machine learning feature vectors to see if the file can be conclusively determined to be either malicious or clean. In either case, the server can provide the client with a response and log the details of the transaction, including, but not limited to, a timestamp specifying when the transaction took place, a client identifier (which is a string that can help uniquely identify the client), the various fingerprints used, and an encoding of the final disposition associated with the file at the time of the transaction (i.e., good/bad/unknown).

The agent software on the client, upon receiving a disposition from the server, can act according to a specified policy that describes what actions to take on a given disposition. If a file is determined to be conclusively malicious, it can be moved from its present location into a special quarantine area. If a file is determined to be conclusively clean, it can be marked as such. Finally, if a file has an unknown disposition, the agent can determine what to do according to the policy. Possibilities include treating an unknown as if it were benign (i.e., not doing anything) or treating an unknown as if it were malicious (i.e., quarantining) Additional possibilities include doing further processing on an unknown file. In either case, the details of the transaction can be logged and cached for future purposes.

Periodically, as the server learns about new malicious software or new benign software, it can cross reference this new information against previous logs to look for discrepancies. For example, it can look for transactions in which files that were previously labeled malicious are now believed to be good. Likewise, it can look for transactions in which files that were previously thought to be good or unknown are now thought to be malicious. In a similar fashion if a new model is developed for determining disposition from feature vectors, each feature vector from previous transactions can be checked against this model to search for discrepancies (i.e., situations in which a file was previously thought to be good or unknown on the basis of a feature vector but is now thought to be malicious, as well as situations in which a file was previously thought to be malicious on the basis of a feature vector, but is now believed to be clean on the basis of a more recent model).

Because a step involving evaluation of a feature vector can be more computationally expensive than a step involving direct comparison of signatures, the former can be performed only if the latter was inconclusive. Finally, to reduce costs, all of these steps can be carried out only on a certain portion of the data, such as logs from the last thirty days. During this process, the user identifiers associated with discrepancies (i.e., files that were unknown or malicious that are now believed to be good as well as files that were unknown or good that are now believed to be malicious) can be recorded together with an identifier for the file as well as the updated disposition.

Periodically, the agent software running on an end-user system will query the server to see if its identifier is recorded among those for which a discrepancy has been noted. (This can happen by having the agent provide its identifier to the server, and having the server check this identifier against its logs; alternatively, the server can provide a list of identifiers to the agent and have the agent check.)

If the agent's identifier is listed among those for which there is a discrepancy, then the agent can be provided with the file associated with the discrepancy as well as the updated disposition of file.

Based on the file's new disposition, the agent can carry out steps given in a pre-defined policy. For example, if a file that was previously thought to be either good or unknown is now believed to be malicious, then the agent can remove that file together with any artifacts associated with that file. To do so, it may need to reference the identifier provided by the server with its own local logs to see where the file is located on the file system of the client computer on which the agent is running. In the art, a file is typically moved into a special quarantine area on the file system so that it can be restored in the event that a mistake was made.

If instead, the file in question was previously thought to be malicious, but is now believed to be good, then the agent can restore the file to its original location. To do so requires that the file was never completely deleted in the first place. In the art, rather than deleting a file, it can be put into a quarantine area from where it can be restored if needed.

Whereas many alterations and modifications of the present invention will no doubt become apparent to a person of ordinary skill in the art after having read the foregoing description, it is to be understood that any particular embodiment shown and described by way of illustration is in no way intended to be considered limiting.

What is claimed is:

1. A method comprising:
   receiving at a server, information relating to files on a client device comprising metadata including at least one file attribute or behavioral characteristic associated with execution of the files;
   storing on the server, the information relating to the files on the client device;
   receiving at the server, information useful in classifying files as a threat;
   classifying at the server, each of the files on the client device based on the information relating to the files on the client device and the information useful in classifying files as a threat;
   receiving at the server, updated information useful in classifying files as a threat;
   determining at the server, whether a classification for each file on the client device has changed based on the updated information; and
   responsive to a determination that a classification for a particular file on the client device has changed to not be a threat, sending an instruction from the server to the client device or to an administrative device responsible for the client device that the particular file is available for use by the client device.

2. The method of claim 1, wherein the information useful in classifying files as a threat comprises information useful in classifying files as benign, malicious, or unknown.

3. The method of claim 1, wherein the updated information useful in classifying files as a threat includes information about new malware.

4. The method of claim 1, further comprising receiving at the server, information useful in the identification of non-malicious files.

5. The method of claim 1, further comprising receiving at the server, information useful in removal of malicious files.

6. The method of claim 1, further comprising compiling on the server a list of client devices that contain malicious software together with identifiers for files that contain the malicious software.

7. The method of claim 1, further comprising communicating to the client device information useful in removal of malicious files.

8. The method of claim 1, further comprising receiving at the server, at least one query from the client device concerning whether a determination has been made that files on the client device include malicious software.

9. One or more non-transitory computer readable storage media encoded with software comprising computer executable instructions and when the software is executed operable to cause a processor to:
receive information relating to files on a client device comprising metadata including at least one file attribute or behavioral characteristic associated with execution of the files;
store the information relating to the files on the client device;
receive information useful in classifying files as a threat;
classify each of the files on the client device based on the information relating to the files on the client device and the information useful in classifying files as a threat;
receive updated information useful in classifying files as a threat;
determine whether a classification for each file on the client device has changed based on the updated information; and
responsive to a determination that a classification for a particular file on the client device has changed to not be a threat, send an instruction to the client device or to an administrative device responsible for the client device that the particular file is available for use by the client device.

10. The computer readable storage media of claim 9, wherein the information useful in classifying files as a threat comprises information useful in classifying files as benign, malicious, or unknown.

11. The computer readable storage media of claim 9, wherein the updated information useful in classifying files as a threat includes information about new malware.

12. The computer readable storage media of claim 9, further comprising computer executable instructions operable to cause the processor to compile a list of client devices that contain malicious software together with identifiers for files that contain the malicious software.

13. An apparatus comprising:
a network interface to communicate with a client device over a computer network; and
a processor coupled to the network interface and configured to:
receive information relating to files on a client device comprising metadata including at least one file attribute or behavioral characteristic associated with execution of the files;
store the information relating to the files on the client device;
receive information useful in classifying files as a threat;
classify each of the files on the client device based on the information relating to the files on the client device and the information useful in classifying files as a threat;
receive updated information useful in classifying files as a threat;
determine whether a classification for each file on the client device has changed based on the updated information; and
responsive to a determination that a classification for a particular file on the client device has changed to not be a threat, send an instruction to the client device or to an administrative device responsible for the client device that the particular file is available for use by the client device.

14. The apparatus of claim 13, wherein the processor receives information useful in classifying files as a threat including information useful in classifying files as benign, malicious, or unknown.

15. The apparatus of claim 13, wherein the processor receives updated information useful in classifying files as a threat including information about new malware.

16. The apparatus of claim 13, wherein the processor further compiles a list of client devices that contain malicious software together with identifiers for files that contain the malicious software.

* * * * *